United States Patent
Aimi et al.

(10) Patent No.: US 8,164,658 B2
(45) Date of Patent: Apr. 24, 2012

(54) NOISE REDUCTION APPARATUS AND IMAGE PICKUP APPARATUS

(75) Inventors: Masahiro Aimi, Kawasaki (JP); Masaaki Matsuoka, Yokohama (JP)

(73) Assignee: Canon Kabushiki Kaisha (JP)

( * ) Notice: Subject to any disclaimer, the term of this patent is extended or adjusted under 35 U.S.C. 154(b) by 528 days.

(21) Appl. No.: 12/364,891

(22) Filed: Feb. 3, 2009

(65) Prior Publication Data

US 2009/0201392 A1    Aug. 13, 2009

(30) Foreign Application Priority Data

Feb. 12, 2008  (JP) ................................. 2008-030417

(51) Int. Cl.
*H04N 5/217*   (2011.01)
*H04N 5/235*   (2006.01)

(52) U.S. Cl. ..................................... 348/241; 348/222.1

(58) Field of Classification Search .................. 348/241, 348/243, 248, 222.1
See application file for complete search history.

(56) References Cited

U.S. PATENT DOCUMENTS

2006/0132624 A1*   6/2006   Yuyama ........................ 348/241

FOREIGN PATENT DOCUMENTS

| JP | 2003-219209 A | 7/2003 |
| JP | 2003-317409 A | 11/2003 |

* cited by examiner

*Primary Examiner* — Joseph P Martinez
*Assistant Examiner* — Brandi Thomas
(74) *Attorney, Agent, or Firm* — Rossi, Kimms & McDowell LLP

(57) ABSTRACT

A noise reduction apparatus, in which an occurrence of overcorrection attributed to an erroneous detection is prevented. A storage unit stores a pseudo noise signal generating characteristic. A pseudo noise generating unit sets a signal which may become a source of a noise superimposed on a video signal as a reference input signal and generates a pseudo noise signal corresponding to the superimposed noise using the pseudo noise signal generating characteristic which is stored in the storage unit and which corresponds to the reference input signal. A subtraction unit subtracts the pseudo noise signal from the video signal.

11 Claims, 4 Drawing Sheets

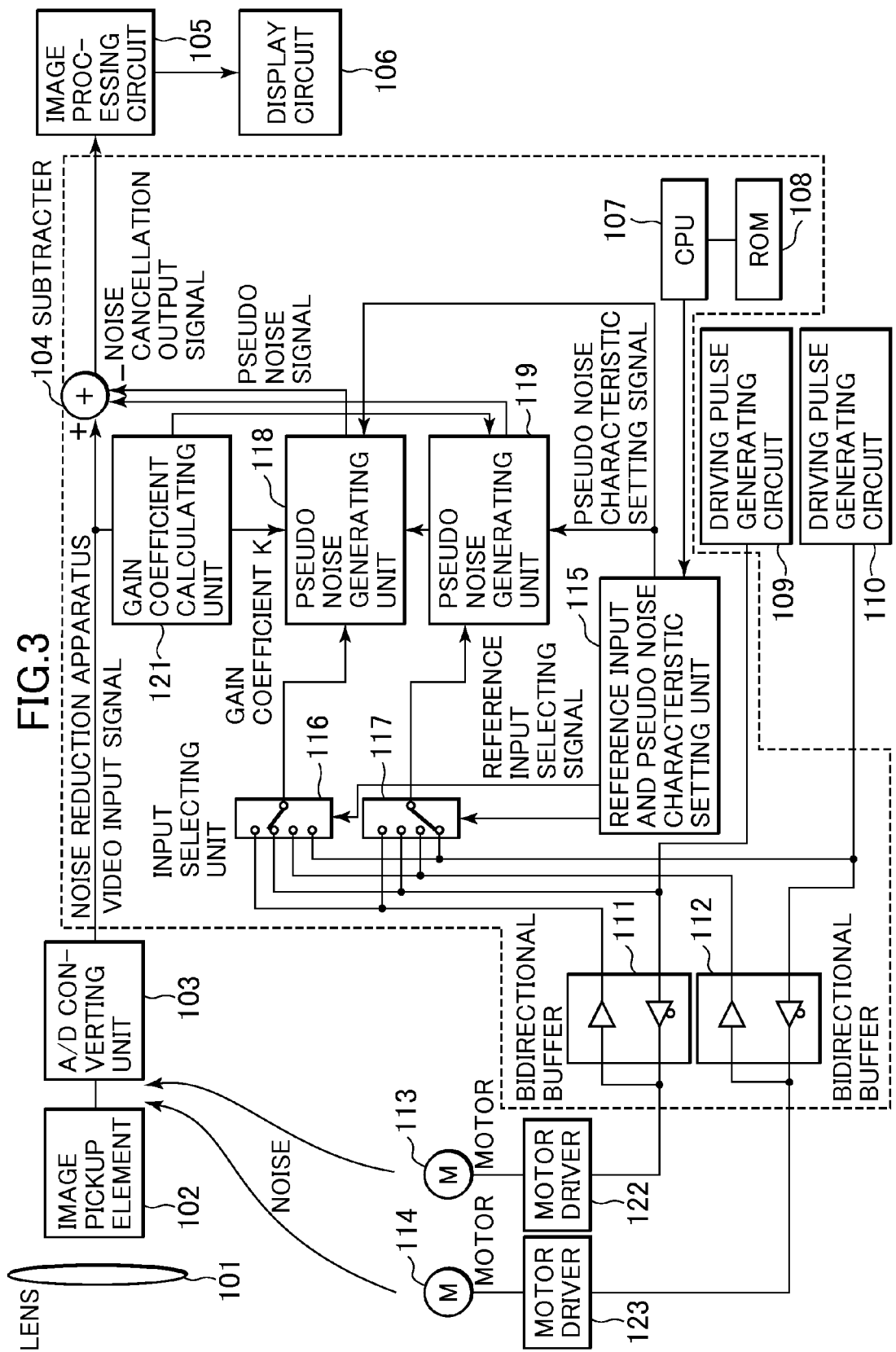

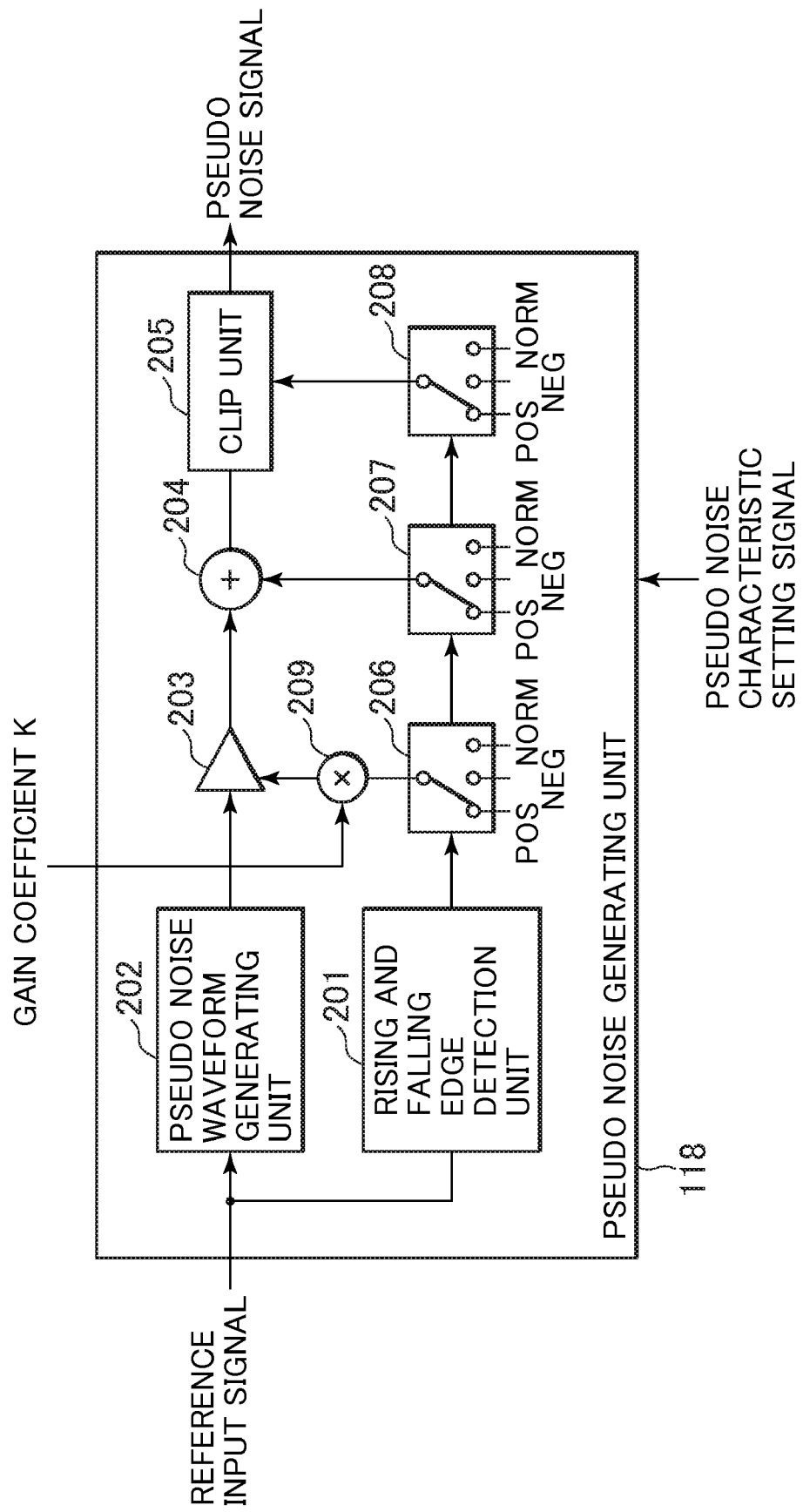

NOISE REDUCTION APPARATUS AND IMAGE PICKUP APPARATUS

BACKGROUND OF THE INVENTION

1. Field of the Invention

The present invention relates to a noise reduction apparatus adapted to reduce noise in a video signal using a pseudo noise signal generated according to a signal which may be a noise source and an image pickup apparatus provided with the noise reduction apparatus.

2. Description of the Related Art

For example, in a video camera, there has been proposed a noise reduction apparatus adapted to reduce a periodic mechanical noise generated by a recording tape contacting a rotary magnetic head (for example, Japanese Laid-Open Patent Publication (Kokai) No. 2003-317409).

The above conventional noise reduction apparatus is described below.

The conventional noise reduction apparatus mainly includes an adaptive signal processing circuit and a pseudo noise subtracter. The adaptive signal processing circuit receives a reference input pulse signal synchronized with a noise signal to be reduced to produce a pseudo noise signal which is approximate to the noise signal to be reduced.

The pseudo noise subtracter subtracts the pseudo noise signal from a main input signal on which the noise signal to be reduced is superimposed and feeds the difference back to the adaptive signal processing circuit to update the adaptive signal processing circuit to minimize the noise power of a subtraction output.

Thus, the conventional noise reduction apparatus feeds the output of the pseudo noise subtracter back to the adaptive signal processing circuit to cause the adaptive signal processing circuit to learn a noise characteristic by using an adaptive signal processing. This probably causes overcorrection in which the main signal component that is highly correlative to a signal of a noise-source is erroneously detected as a noise and subtracted.

SUMMARY OF THE INVENTION

The present invention provides a noise reduction apparatus that prevents overcorrection from being caused by the erroneous detection and an image pickup apparatus provided with the noise reduction apparatus.

Accordingly, in a first aspect of the present invention, there is provided a noise reduction apparatus comprising a storage unit that stores a pseudo noise signal generating characteristic, a pseudo noise generating unit that sets a signal which may become a source of a noise superimposed on a predetermined video signal as a reference input signal and generates a pseudo noise signal corresponding to the superimposed noise using the pseudo noise signal generating characteristic which is stored in the storage unit and which corresponds to the reference input signal, and a subtraction unit that subtracts the pseudo noise signal generated by the pseudo noise generating unit from the video signal.

Moreover, in a second aspect of the present invention, there is provided an image pickup apparatus comprising the noise reduction apparatus according to the first aspect of the present invention.

According to the present invention, it is enabled to prevent overcorrection from being caused by the erroneous detection and reduce noise from a plurality of noise sources. It is also enabled to pick up an image whose noise is reduced.

The features and advantages of the invention will become more apparent from the following detailed description taken in conjunction with the accompanying drawings.

BRIEF DESCRIPTION OF THE DRAWINGS

FIG. 3 is a block diagram showing a schematic circuit configuration of an image pickup apparatus provided with a noise reduction apparatus according to a third embodiment of the present invention.

FIG. 4 is a block diagram showing details of a pseudo noise generating unit in FIG. 1.

DETAILED DESCRIPTION OF THE PREFERRED EMBODIMENTS

The present invention will now be described in detail below with reference to the accompanying drawings showing preferred embodiments thereof.

Figure 1:
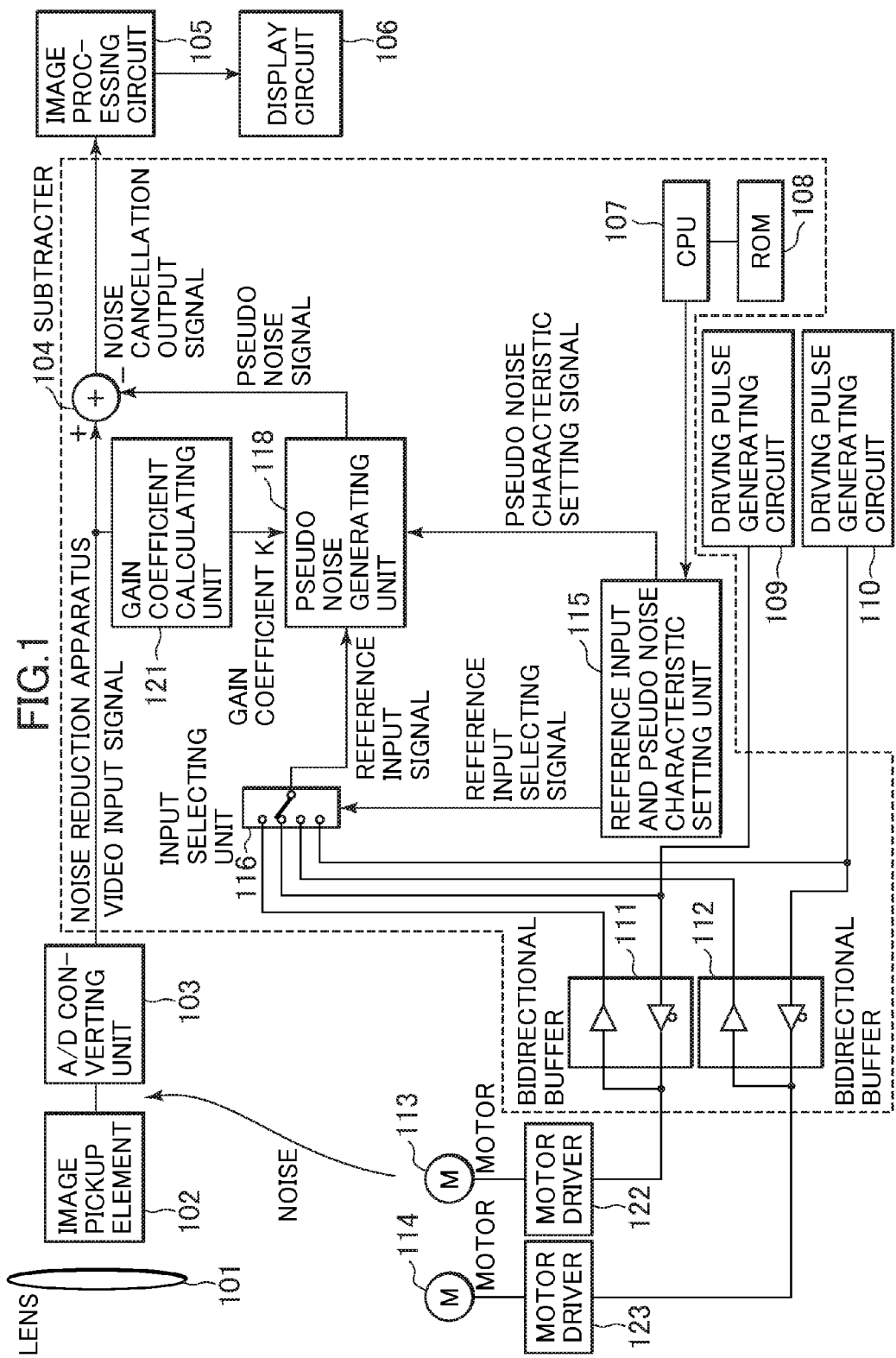
FIG. 1 is a block diagram showing a schematic circuit configuration of an image pickup apparatus provided with a noise reduction apparatus according to a first embodiment of the present invention.

FIG. 1 is a block diagram showing a schematic circuit configuration of an image pickup apparatus provided with a noise reduction apparatus according to a first embodiment of the present invention.

The noise reduction apparatus mounted on the image pickup apparatus includes, as components thereof, a CPU 107, an ROM (storage unit) 108, a reference input and pseudo noise characteristic setting unit 115, an input selecting unit 116, a pseudo noise generating unit 118, a gain coefficient calculating unit 121, a subtracter 104 and bidirectional buffers 111 and 112, among various components shown in FIG. 1. There is described below the configuration and operation of the image pickup apparatus.

In the image pickup apparatus shown in FIG. 1, a lens 101 images light emitted from an object to be picked up (a target object) on a light receiving surface of an image pickup element 102. The image pickup element 102 photo-electrically converts optical brightness of the target object image to an electric charge amount in a pixel-by-pixel, and outputs an analog video signal according to the intensity of light to an A/D converting unit 103.

The A/D converting unit 103 converts the analog video signals outputted from the image pickup element 102 to RGB digital video signals (hereinafter, referred to as "video input signal"). An image processing circuit 105 converts the video input signal (to be more exact, a noise-cancelled output signal, as described later) sent from the A/D converting unit 103 to an image data including luminance information and color difference information. A display circuit 106 converts the image data sent from the image processing circuit 105 to image data based on a predetermined system for display such as National Television System Committee (NTSC) system and displays an image on a Liquid Crystal Display (LCD) or the like.

The ROM 108 stores a program for controlling the image pickup apparatus and data required for control (for example, characteristic data used for generating a pseudo noise signal by the pseudo noise generating unit 118) and so on. The CPU 107 is connected to the ROM 108 and controls the overall system of the image pickup apparatus in accordance with a predetermined program read from the ROM 108.

Motors 113 and 114 are electromotive units adapted to drive the lens 101. Driving pulse generating circuits 109 and 110 generate driving pulses for driving the motors 113 and 114. Motor drivers 122 and 123 drive the motors 113 and 114 based on the driving pulses generated by the driving pulse generating circuits 109 and 110. The bidirectional buffers 111 and 112 are elements for transferring signals between the driving pulse generating circuits 109 and 110 and the motor drivers 122 and 123 respectively.

The pseudo noise generating unit 118 generates a pseudo noise signal corresponding to a noise to be reduced. The reference input signal inputted to the pseudo noise generating unit 118 is a signal which may become a noise source generating a noise superimposed on the video input signal and is selected by the input selecting unit 116. The reference input signal selected by the input selecting unit 116 and the characteristic of the pseudo noise signal generated by the pseudo noise generating unit 118 are determined by the output (a pseudo noise characteristic setting signal) of the reference input and pseudo noise characteristic setting unit 115.

The gain coefficient calculating unit 121 calculates a gain coefficient K used in the pseudo noise generating unit 118 from the video input signal and inputs the result to the pseudo noise generating unit 118. The pseudo noise signal generated by the pseudo noise generating unit 118 is subtracted from a noise-superimposed signal by the subtracter 104. The noise-superimposed signal refers to a signal on which a noise to be reduced is superimposed and corresponds herein to the video input signal.

Other circuits not shown in FIG. 1 are controlled by the CPU 107.

FIG. 4 is a block diagram showing the details of the pseudo noise generating unit in FIG. 1.

As shown in FIG. 4, a pseudo noise waveform generating unit 202 provided in the pseudo noise generating unit 118 generates a pseudo noise waveform corresponding to the waveform of a noise to be reduced from the reference input signal. A gain adjusting unit 203 and an offset adjusting unit 204 adjust the gain and the offset of the pseudo noise waveform generated by the pseudo noise waveform generating unit 202.

A clip unit 205 clips the pseudo noise waveform at a predetermined upper limit. A rising and falling edge detection unit 201 detects the rising and falling edge of the reference input signal. The rising and falling edge selection units 206, 207 and 208 change the adjusted values of the gain adjusting unit 203, the offset adjusting unit 204 and the clip unit 205 by the rising and falling edge of the reference input signal respectively.

POS, NEG and NORM of the rising and falling edge selection units 206, 207 and 208 are parts of the pseudo noise characteristic setting signals and can be set by the CPU 107. A multiplier 209 multiplies a gain coefficient K calculated by the gain coefficient calculating unit 121 by the output of the rising and falling edge selection unit 206 to determine the gain of the gain adjusting unit 203.

In FIG. 1, the video signal between the image pickup element 102 and the A/D converting unit 103 is an analog signal, so that it is susceptible to noise from the outside. The operation of the noise reduction apparatus is described below with reference to an example where noise generated by driving the motor 113 is superimposed on the analog video signal as the noise.

The analog video signals on which the noise due to the motor 113 is superimposed are converted to RGB digital video signals (or, the video input signal) by the A/D converting unit 103. Since the driving pulse of the motor 113 is a noise source, the pseudo noise generating unit 118 is caused to generate a pseudo noise signal corresponding to the noise attributed to the driving pulse of the motor 113 and also superimposed on the analog video signal, in order to reduce the noise included in the video input signal. The subtracter 104 performs noise cancellation in which the pseudo noise signal is subtracted from the video input signal. The method is described in detail below.

The driving pulse of the motor 113 which becomes the noise source is outputted from the driving pulse generating circuit 109. The driving pulse passes through the bidirectional buffer 111 and reaches the motor driver 122. The motor driver 122 drives the motor 113 based on the driving pulse.

The CPU 107 instructs the reference input and pseudo noise characteristic setting unit 115 to select the output of the driving pulse generating circuit 109 which becomes the noise source from among the outputs of the driving pulse generating circuits 109 and 110.

The reference input and pseudo noise characteristic setting unit 115 sends a reference input selecting signal to the input selecting unit 116 in accordance with the instruction of the CPU 107. The input selecting unit 116 selects the input or a return output of the bidirectional buffer 111 that is a signal which potentially becomes the noise source in accordance with the reference input selecting signal. The output from the input selecting unit 116 becomes the reference input signal.

The term "return output" refers to a signal in which a signal inputted to an external output buffer of the bidirectional buffer 111 is inputted again through an inner input buffer.

As shown in FIG. 4, the reference input signal inputted to the pseudo noise generating unit 118 is inputted to the pseudo noise waveform generating unit 202 to generate the pseudo noise waveform corresponding to the waveform of a noise to be reduced therein.

Although not shown in FIG. 4, the characteristics of the pseudo noise waveform generating unit 202 can be set by the pseudo noise characteristic setting signal according to the noise to be reduced. The pseudo noise waveform generating unit 202 is connected to the gain adjusting unit 203 and the offset adjusting unit 204. The gain and the offset of the pseudo noise waveform generated by the pseudo noise waveform generating unit 202 are adjusted by the gain adjusting unit 203 and the offset adjusting unit 204 respectively.

The pseudo noise waveform whose gain and offset are adjusted is inputted to the clip unit 205 and clipped at the predetermined upper limit therein to prevent overcorrection. The reference input signal inputted to the pseudo noise generating unit 118 passes through the above circuits and turns into the pseudo noise signal corresponding to the noise to be reduced. The pseudo noise signal is subtracted later by the subtracter 104 from the video input signal on which the noise is superimposed. The thus generated noise cancellation output signal is inputted to the image processing circuit 105.

The reference input signal inputted to the pseudo noise generating unit 118 is inputted both to the pseudo noise waveform generating unit 202 and the rising and falling edge detection unit 201. The rising and falling edge detection unit 201 detects the rising or falling edge of the reference input signal. The detected signal is sent to the rising and falling edge selection units 206, 207 and 208.

The rising and falling edge selection units 206, 207 and 208 determine the adjusted values of the gain adjusting unit 203, the offset adjusting unit 204 and the clip unit 205 in the case of rising edge, falling edge and others, respectively.

More specifically, if the reference input signal is a rising edge, the adjusted value of POS is selected. If the reference input signal is a falling edge, the adjusted value of NEG is selected. Other than those above, the adjusted value of NORM is selected. Different or the same values may be set to POS, NORM and NEG.

Thus, the characteristics of the pseudo noise generating unit 118 are changed by the rising and falling edge of the reference input signal. Thereby, even if the pseudo noise waveforms generated at the rising and falling edge of the reference input signal respectively are different in amplitude and offset from each other, it is enabled to realize the noise reduction apparatus capable of generating the pseudo noise signal corresponding to that.

The characteristics of the pseudo noise waveform generated by the pseudo noise waveform generating unit 202 and the adjusted values of POS, NORM and NEG in the rising and falling edge selection units 206, 207 and 208 are determined by the pseudo noise characteristic setting signal.

Data for generating the pseudo noise signal (the pseudo noise signal generating characteristic) in the pseudo noise generating unit 118 is previously stored in the ROM 108. The CPU 107 sends the reference input selecting signal to the reference input and pseudo noise characteristic setting unit 115, selects the pseudo noise signal generating characteristic corresponding to the reference input selecting signal from a plurality of the pseudo noise signal generating characteristics stored in the ROM 108 to read the data, and sends it to the reference input and pseudo noise characteristic setting unit 115.

The reference input and pseudo noise characteristic setting unit 115 sends the reference input selecting signal sent from the CPU 107 to the input selecting unit 116 and sends the pseudo noise signal generating characteristic data stored in the ROM 108 to the pseudo noise generating unit 118 as the pseudo noise characteristic setting signal.

As described above, in the present invention, the pseudo noise signal generated by the pseudo noise generating unit 118 is updated using the ROM 108 storing the pseudo noise signal generating characteristic data. This eliminates the need for feeding back the output of the pseudo noise subtracter to the adaptive signal processing circuit to cause it to learn a pseudo noise by using an adaptive signal processing, as is not the case with the conventional art. This enables the realization of the noise reduction apparatus that does not cause overcorrection in which the main signal component that is highly correlative to the signal of a noise-source is erroneously detected as a noise and subtracted.

If a noise source is changed over, the pseudo noise signal is updated at the same time with the changeover of the reference input signal in the input selecting unit 116 to enable instantly generating the pseudo noise signal corresponding to the noise source. As a result, it is enabled to realize the noise reduction apparatus capable of reducing noise continuously generated by a plurality of noise sources.

The gain coefficient calculating unit 121 outputs the gain coefficient K according to the intensity level of the video input signal and sends it to the gain adjusting unit 203 of the pseudo noise generating unit 118 so that the gain of the pseudo noise signal generated by the pseudo noise generating unit 118 can be changed according to the intensity level of the video input signal.

Aside from the intensity level of the video input signal, luminance and color difference may be created in a simple manner from the video input signal with a low-order filter to change the gain coefficient K based on the level of the luminance and color difference. In the gain adjusting unit 203, the multiplier 209 multiplies the output of the rising and falling edge selection unit 206 by the gain coefficient K from the gain coefficient calculating unit 121 so as to change the gain according to the intensity level of the video input signal (appropriately refer to FIG. 4).

Even if the gain of noise is varied according to the intensity level of the video input signal, varying the gain of the pseudo noise signal according to the intensity level of the video input signal allows the realization of the noise reduction apparatus capable of generating the pseudo noise signal corresponding to the noise.

Like the input selecting unit 116, the reference input signal can be selected from among a plurality of signals, so that if a signal which is likely to turn into a noise is found in the plurality of signals, the signal can be rendered to be the reference input signal. This allows the noise to be reduced. Thus, there can be realized the noise reduction apparatus which is capable of reducing the noise without providing a new noise reduction apparatus.

Although the noise source has been described herein using two outputs of the driving pulse generating circuits 109 and 110, to increase the number of signals inputted to the input selecting unit 116 enables coping with the noise attributable to more noise sources.

Although the input selecting unit 116 may select the input or the return output of the bidirectional buffers 111 and 112, the selection of the return output permits the pseudo noise signal to be generated only when the signal of the noise source is outputted.

Figure 2:
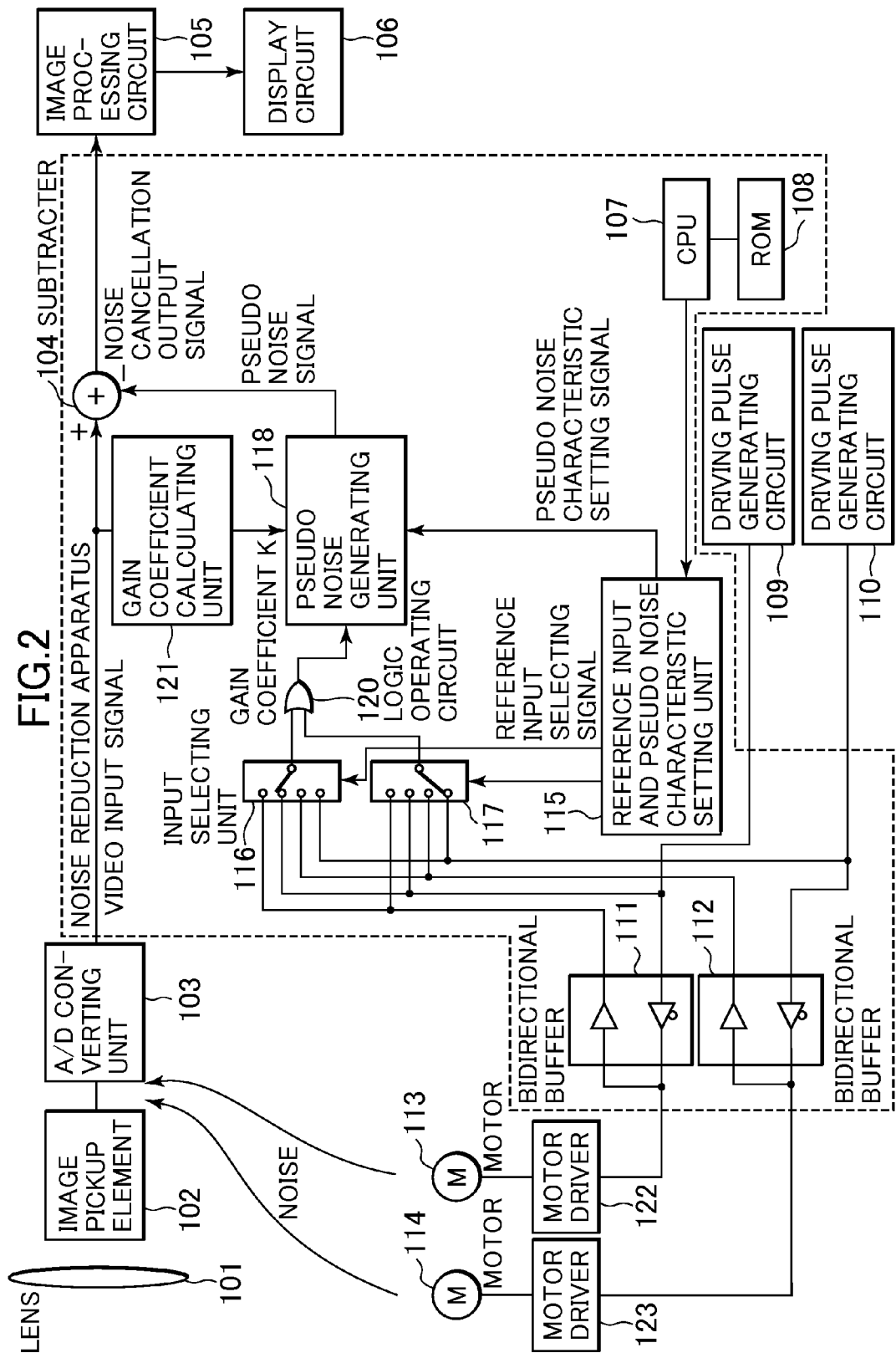
FIG. 2 is a block diagram showing a schematic circuit configuration of an image pickup apparatus provided with a noise reduction apparatus according to a second embodiment of the present invention.

FIG. 2 is a block diagram showing a schematic circuit configuration of an image pickup apparatus provided with a noise reduction apparatus according to a second embodiment of the present invention.

The noise reduction apparatus according to the second embodiment is different from the noise reduction apparatus according to the first embodiment in terms of further provided with an input selecting unit 117 and a logic operation circuit 120.

The operation of the noise reduction apparatus is described below with reference to an example of a noise in which noises stemming from the motors 113 and 114 superimpose together in a different timing and jump into between the image pickup element 102 and the A/D converting unit 103. However, the transmission paths of both noises are the same as each other.

As shown in FIG. 2, the input selecting unit 116 selects the outputs from the driving pulse generating circuit 109 and the input selecting unit 117 selects the outputs from the driving pulse generating circuit 110.

The logic operation circuit 120 obtains a logical sum of the signals which are selected and outputted by the input selecting units 116 and 117, and the resultant reference input signal is inputted to the pseudo noise generating unit 118. Thereby, the pseudo noise generating unit 118 can be caused to generate a pseudo noise signal corresponding to noises stemming from two noise sources.

Thus, setting the logical operation result of a plurality of signals as the reference input signal allows the realization of the noise reduction apparatus capable of removing a noise from the video input signal including the noise generated by a plurality of signals being superimposed together in a different timing.

FIG. 3 is a block diagram showing a schematic circuit configuration of an image pickup apparatus provided with a noise reduction apparatus according to a third embodiment of the present invention.

The noise reduction apparatus according to the third embodiment is different from the noise reduction apparatus according to the first embodiment in terms of provided with two input selecting units 116 and 117 and two pseudo noise generating units 118 and 119.

The operation of the noise reduction apparatus is described below with reference to an example of a noise in which noises stemming from the motors 113 and 114 simultaneously jump into between the image pickup element 102 and the A/D converting unit 103.

The input selecting unit 116 and the pseudo noise generating unit 118 use the driving pulse for the motor 113 as the reference input signal to generate the pseudo noise signal. The input selecting unit 117 and the pseudo noise generating unit 119 use the driving pulse for the motor 114 as the reference input signal to generate the pseudo noise signal.

Thus, even though the noises stemming from the motors 113 and 114 enter simultaneously, the pseudo noise signals corresponding to the respective noises can be created to reduce the noises included in the video input signal.

The noise reduction apparatus according to the third embodiment is provided with a plurality of pseudo noise generating units (the pseudo noise generating units 118 and 119). This allows the realization of the noise reduction apparatus which, even though a plurality of noises different in transmission characteristic enters simultaneously, causes the pseudo noise signals corresponding to the noises to be simultaneously generated to reduce the noises.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-30417 filed Feb. 12, 2008, which is hereby incorporated by reference herein in its entirety.

What is claimed is:

1. A noise reduction apparatus comprising:
   a storage unit adapted to store a pseudo noise signal generating characteristic;
   a pseudo noise generating unit adapted to set a signal which may become a source of a noise superimposed on a predetermined video signal as a reference input signal and to generate a pseudo noise signal corresponding to the superimposed noise using the pseudo noise signal generating characteristic which is stored in said storage unit and which corresponds to the reference input signal; and
   a subtraction unit adapted to subtract the pseudo noise signal generated by said pseudo noise generating unit from the video signal.

2. The noise reduction apparatus according to claim 1, wherein
   said storage unit stores the plurality of generating characteristics and said pseudo noise generating unit generates the pseudo noise signal using the generating characteristics corresponding to the reference input signal selected from among the plurality of generating characteristics stored in said storage unit.

3. The noise reduction apparatus according to claim 2, wherein
   said pseudo noise generating unit changes the pseudo noise signal generating characteristic to be selected, according to a rising and falling edge of the reference input signal.

4. The noise reduction apparatus according to claim 2, wherein
   said pseudo noise generating unit changes the pseudo noise signal generating characteristic to be selected, based on a intensity level of the video signal.

5. The noise reduction apparatus according to claim 2, further comprising:
   a logic operation unit adapted to generate a signal in which a plurality of signals which may become a source of the noise superimposed on the video signal is subjected to a logical operation, as the reference input signal inputted to said pseudo noise generating unit.

6. The noise reduction apparatus according to claim 2, wherein
   an output of an inner input buffer of a bidirectional buffer used for transmission and reception of an external signal is used as the reference input signal inputted to said pseudo noise generating unit.

7. The noise reduction apparatus according to claim 2, comprising:
   a plurality of said pseudo noise generating unit.

8. The noise reduction apparatus according to claim 2, further comprising:
   a selection unit adapted to select the reference input signal inputted to said pseudo noise generating unit from among a plurality of signals including a signal which may become a source of the noise superimposed on the video signal.

9. The noise reduction apparatus according to claim 8, wherein
   said pseudo noise generating unit changes the pseudo noise signal generating characteristic selected from said storage unit according to the reference input signal selected by said selection unit to update the pseudo noise signal to be generated.

10. The noise reduction apparatus according to claim 8, further comprising:
    a plurality of said selection units and of said pseudo noise generating units.

11. An image pickup apparatus comprising:
    the noise reduction apparatus according to claim 1.

* * * * *